United States Patent Office 3,479,527
Patented Nov. 18, 1969

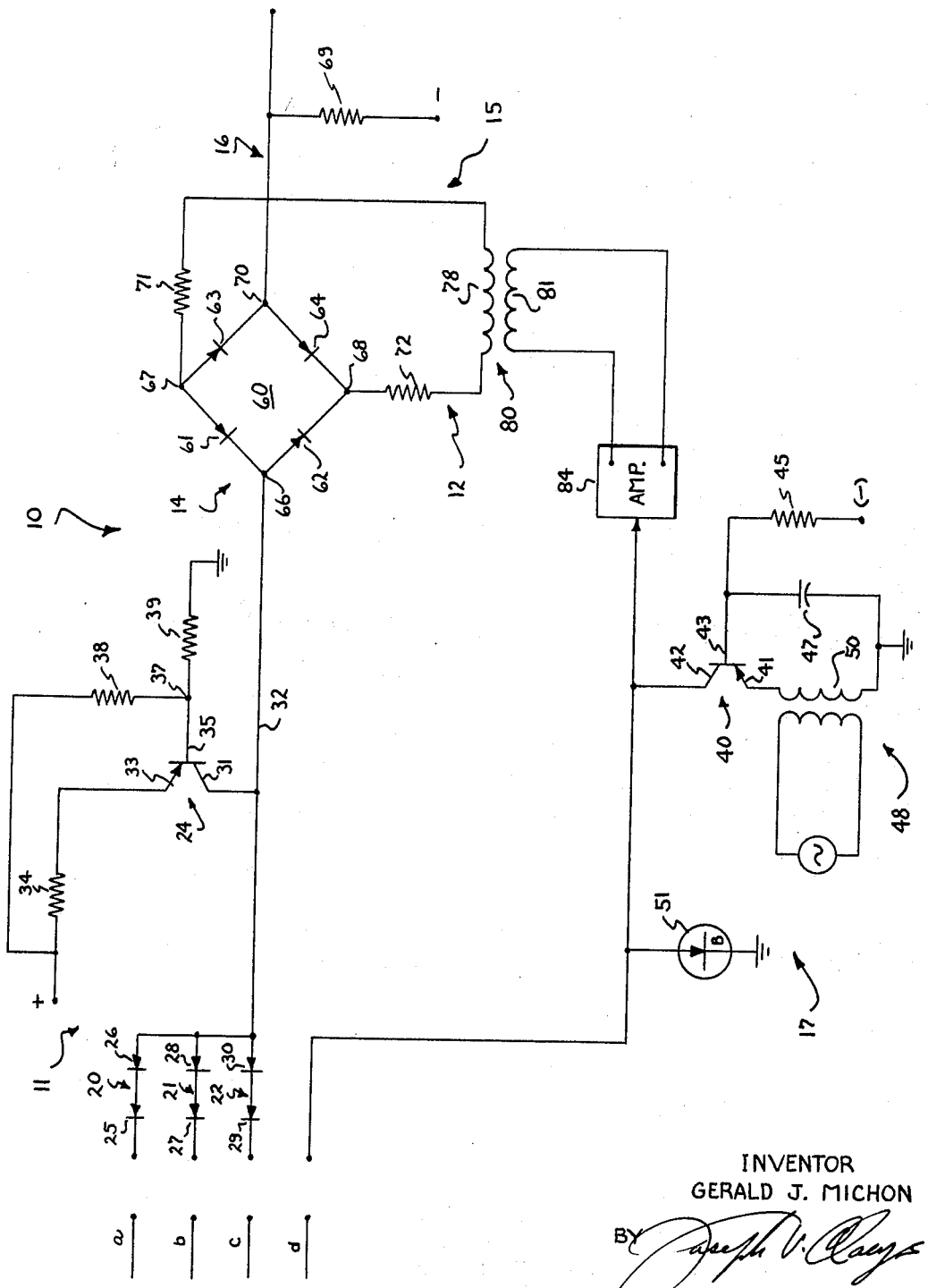

3,479,527
MINIMUM QUANTITY SELECTOR WITH FAIL-SAFE OVERRIDE
Gerald J. Michon, Waterford, N.Y., assignor to General Electric Company, a corporation of New York
Filed Mar. 1, 1967, Ser. No. 619,672
Int. Cl. H03k 17/00, 5/20
U.S. Cl. 307—235                                                                    4 Claims

ABSTRACT OF THE DISCLOSURE

A minimum quantity selector arrangement wherein an alternating current output signal is provided from a number of available unidirectional voltage signals and wherein the maximum value of the A-C output signal never exceeds that determined by a preselected one of the available signals. All of the signals, except the preselected signal, are applied to the input of a minimum signal level selector which provides an output containing only the smallest of such signals. The preselected signal is converted to an A-C voltage signal having an amplitude determined by the magnitude of the preselected signal. The output signal from the minimum signal level selector is applied to one input and the A-C signal is applied to the other input of a controlled gate circuit means, including a diode bridge, and operates to produce an A-C voltage output signal having an amplitude determined by the input signal having the smaller value.

---

This invention relates generally to electrical magnitude selection and more particularly to a minimum quantity selector arrangement wherein one of a number of available electrical signals is assigned first priority to assure that the output signal from the selector arrangement is representative of the smallest of such available signals and of a maximum magnitude which can never exceed that of the electrical signal assigned first priority.

While the present invention has a wide range of applications wherever there is a need for a "smaller" selection, it is especially suited for use in systems for automatically controlling the operation of vechicles and will be particularly described in that connection.

In automatic vehicle control systems, such as for example, the automatic control system for vehicles described in copending patent application Ser. No. 518,171 filed Jan. 3, 1966 and assigned to the assignee of the present invention, it is often necessary to select from a number of available electrical quantities the one having the smallest value. In other automatic systems for controlling trical signals, there are developed a number of electrical signals representing different modes of vehicle operation with the lowest magnitude signal representing the most restrictive operating mode. To assure "fail-safe" operation, that is, operation in the most restrictive mode called for by a number of different available electrical signals, it is necessary that the smallest magnitude signal always be chosen to provide the signal for application to the vehicle tractive effort control.

Further "fail-safe" operation requires that one electrical signal—the electrical signal representing a permissible tractive effort command (either propulsion or braking) in accordance with the prevailing vehicle separation distance—be given first priority. That is, this "priority" signal should be arranged to provide an override limit on the applied vehicle tractive effort.

It is an object of this invention, therefore, to provide a minimum quantity selector arrangement for providing an output signal whose value is representative of the smallest of a number of available electrical signals and never exceeds that of a preselected one of them.

It is another object of this invention to provide a method of producing, in a "fail-safe" manner, and output signal whose value is always representative of the smallest of a number of available electrical signals.

It is a further object of this invention to provide a controlled gate circuit capable of providing from an applied unidirectional voltage signal and an applied alternating current voltage signal, and alternating current output signal whose amplitude is determined by the lesser of the amplitudes of the unidirectional voltage and alternating current voltage signals.

Briefly stated, in accordance with one aspect of this invention, there is provided a new and improved minimum quantity selector arrangement for producing an output signal whose maximum value can never exceed a level determined by a preselected one of a number of available electrical unidirectional voltage signals. Means are provided for converting the preselected unidirectional voltage signal to an alternating current voltage signal whose amplitude is determined by the magnitude of said preselected unidirectional voltage signal. There is also provided a minimum signal level selector circuit to which all of the remaining unidirectional voltage signals are applied and which selector circuit is operative to eliminate from its output all except the smallest of such signals. There is further provided a controlled gate circuit means having a first input means, to which the output of the minimum selector circuit is applied, and a second input means to which the alternating current signal produced from the preselected unidirectional voltage signal is applied which gate circuit is operative to produce an alternating current output signal whose amplitude is determined by the lesser amplitude signal applied at the input means thereof.

The novel features believed characteristic of the present invention are pointed out with particularity in the appended claims. The invention itself, however, both as to its organization and method of operation, as well as further objects and advantages thereof, may best be understood by reference to the following description taken in conjunction with the accompanying drawing in which the sole figure thereof is a schematic circuit diagram of a preferred embodiment of the invention.

Although specific terms are used in the following description for clarity in describing the invention, these specific terms are intended to refer only to the arrangement illustrated in the drawing and are not intended to define or limit the scope of the invention.

Referring now to the drawing, the minimum quantity selector arrangement, designated generally at 10, includes a minimum signal level selector 11 which is operative to eliminate from its output all except the smallest of the signals applied to its input. The arrangement also includes a controlled gate circuit means 12 having a first input means 14, a second input means 15 and an output means 16. Controlled gate circuit means 12 is responsive to a unidirectional voltage signal at the first input means 14 and an A-C voltage signal at the second input means 15 to produce at output means 16 an A-C voltage signal whose amplitude is determined by the input signal of lesser magnitude.

Briefly, all of the unidirectional voltage signals, except the one preselected to provide the fail-safe override, are applied to the input of minimum signal level selector 11 to provide an output therefrom corresponding to the smallest of such unidirectional voltage signals. For simplicity of explanation, only four signals are shown, $a$, $b$, $c$ and $d$, with signal $d$ utilized as the preselected, or override, signal. The preselected signal $d$ is applied to a suitable circuit means 17, shown as a D-C chopper, which converts such signal into an A-C voltage signal the amplitude of which is determined by the magnitude of the preselected signal $d$. This A-C voltage signal is then applied to the second input means 15 of controlled gate circuit means 12 with the output from minimum signal level selector 11 being applied to the first input means 14 thereof so that there appears at output means 16 an alternating current signal whose amplitude is determined by the input signal having the lesser value. Thus, the A-C voltage signal at output means 16 represents the smallest of the signals $a$, $b$, $c$ and $d$ with the preselected signal $d$ providing a fail-safe override limit to assure that such output signal never exceeds a level determined by such preselected signal.

As shown in more detail in the drawing, all of the unidirectional voltage signals except the preselected override signal are applied to the input of minimum signal level selector 11. In the arrangement illustrated, minimum signal level selector 11 includes a plurality of diode gates 20, 21 and 22—one for each of the unidirectional voltage input signals—arranged to be biased from a constant current source shown as provided by a transistor device 24. Each diode gate is shown as including a pair of series connected diodes to provide a more fail-safe arrangement although a single diode in each gate is all that is required. Thus, diode gate 20 includes diodes 25 and 26, diode gate 21 includes diodes 27 and 28, and diode 22 includes diodes 29 and 30.

For the particular arrangement illustrated, which is operative to select the most negative of the input signals, the polarities are as indicated on the drawing. To this end, the cathodes of the diode gates are connected to the individual input signal sources so that signals $a$, $b$, and $c$ are applied thereto and the anodes of such diode gates are connected in common to the constant current source. For example, the input signals $a$, $b$, and $c$ are applied respectively to the cathodes of diodes 25, 27 and 29 and the anodes of diodes 26, 28 and 30 are connected in common to the conductor 32 which is also the output conductor of minimum signal level selector 11.

The diode gates are arranged to be biased from a constant current source provided by transistor device 24 having its collector electrode 31 connected to conductor 32, its emitter electrode 33 connected through a resistance 34 to a point of operating potential shown as being of positive polarity and its base electrode 35 connected to the junction 37 between series connected voltage divider resistances 38 and 39 connected from the source of operating potential to a point of reference potential shown as ground. Thus, transistor device 24, in combination with resistances 34, 38 and 39, generates a constant current signal to bias the diode gates 20, 21 and 22 so that the input signal with the lesser value will determine the output voltage at conductor 32. For example, neglecting the forward bias resistance of the diodes, whenever an individual diode conducts it applies the negative signal at its cathode to the common point at the anode of all the diodes. The remaining diodes cannot conduct therefore unless a more negative voltage is applied to its cathode so as to forward bias it.

In accordance with this invention, the preselected, or override, signal $d$ is converted to an A-C signal whose amplitude is determined by the magnitude of the preselected signal. To this end in the arrangement illustrated, unidirectional voltage signal $d$ is applied to a D-C chopper circuit 17, including a suitable transistor device 40 having an emitter electrode 41, a collector electrode 42 and a base electrode 43. The preselected signal $d$ is applied to collector electrode 42 of transistor device 40 the base electrode 43 of which is connected through a resistance 45 to a source of operating potential, shown as of negative polarity, and also through a capacitance 47 to a point of reference potential such as ground. An A-C reference or "chopping" signal is applied to transistor device 40 through a suitable coupling transformer 48 the secondary winding 50 of which is connected in series circuit between emitter electrode 41 and ground.

To assure more "fail-safe" operation, the chopper drive voltage applied to emitter electrode 41 is arranged to be of a small enough valve so that failure of the circuit such as by a collector-emitter short circuit, will not provide an A-C output greater than a predetermined maximum value. Also, to prevent overriding the circuit for very large magnitude signals, the input signal to circuit means 17 may be suitably limited by connecting a breakdown diode device 51 between collector electrode 42 and ground. The breakdown voltage of device 51 will determine the maximum negative signal level.

For the polarities shown, each time the base electrode 43 is negative with respect to emitter electrode 41, transistor device 40 is conductive and the collector electrode 42 is brought to substantially ground potential since the A-C voltage drop across secondary winding 50 is small. Thus, as long as the preselected unidirectional voltage signal $d$ is negative, transistor device 40 "chops" to convert this signal to a synchronous A-C voltage whose amplitude is determined by the magnitude of the unidirectional voltage signal $d$ and whose frequency is determined by the frequency of the A-C reference or "chopping" signal applied to the primary winding of coupling transformer 48.

For example, on one half cycle of the A-C chopping voltage when emitter electrode 41 is made positive with respect to base electrode 43, transistor device 40 exhibits the characteristics of a closed switch and the collector electrode 42 is brought to substantially ground potential. On the other half cycle of the A-C chopping voltage the emitter electrode 41 is made negative with respect to the base electrode 43 and transistor device 40 exhibits the characteristics of an open switch.

Resistance 45 and capacitance 47 are provided to stabilize the operating current level of transistor 40 so that current changes due to temperature are minimized. For example, the slow changes in the base to emitter drop caused by changes in temperature are prevented from causing a change in base current since the high value of resistance 45 appears as a stable current source. Thus, even the slightest change in current will cause a voltage drop of a polarity to oppose such change. Also, capacitance 47 holds the voltage at base electrode 43 constant for the rapid changes in voltage at the emitter due to the A-C chopping signal. That is, without capacitance 47, the voltage at base electrode 43 would merely follow the voltage at the emitter, with no change in collector to emitter conduction.

The controlled gate circuit means 12 is operative to combine a unidirectional voltage signal applied at its first input means 14 and an A-C voltage signal applied at its second input means 15 to provide an A-C voltage signal at its output means 16 having an amplitude determined by the smaller of the two input signals. As shown, the unidirectional voltage signal from the output of minimum signal level selector 11 is applied to first input means 14 and the A-C voltage signal from the output of circuit means 17 (D-C chopper) is applied to the second input means 15.

The controlled gate circuit means 12 includes a diode bridge 60 having diode devices 61, 62, 63 and 64. The cathodes of diodes 61 and 63 are connected to the anodes of diodes 62 and 64 respectively and the anodes of diodes 61 and 63 are connected together while the cathodes of diodes 62 and 64 are connected together. Thus, a first junction 66 is provided between the cathode and anode of diodes 61 and 62, a second junction 67 between the anodes of diodes 61 and 63, a third junction 68 between the cathodes of diodes 62 and 64 and a fourth junction 70 between the cathode and anode of diodes 63 and 64. The first input means 14 is connected to the junction 66, the output means 16 to the junction 70 and the second input means 15 to the junctions 67 and 68. Output means 16 includes a bias resistance 69 connected from junction 70 to a source of negative potential. Second input means 15 includes first and second like value resistances 71 and 72 connected respectively from the junctions 67 and 68 to opposite ends of the secondary winding 78 of a suitable step-up coupling transformer 80 having a primary winding 81. Transformer 80 is selected to provide a step-up ratio of 1 to 2.

As shown, the A-C output signal from circuit means 17 is applied to input means 15 through coupling transformer 80. Specifically, the A-C signal appearing on collector electrode 42 of chopper transistor 40 is suitably amplified in amplifier 84 the output of which is coupled to the primary winding 81 of step-up transformer 80 and, by transformer action, coupled to the second input means 15.

The operation of controlled gate circuit means 12 operates in the following manner: assume initially that the amplitude of the unidirectional voltage signal applied to the first input means 14 is less than that of the A-C signal applied to the second input means 15. Under such a condition, the A-C signal is operative to "chop" the unidirectional voltage input signal. For example, during the half cycle of the A-C signal when the junction 67 is positive with respect to the junction 68, current flows through diode bridge 60 switching all the diode devices 61, 62, 63, and 64 thereof to their conductive states. Since all the diode devices have approximately equal conductive voltage drops the A-C voltage at output means 16 is essentially equal to the unidirectional signal applied at input means 14. This condition prevails as long as the current through the loop including resistances 71 and 72 exceeds the current through the diode bridge 60 and bias resistance 69 due to the voltage of the unidirectional signal applied at the first input means 14.

During the half cycle of the A-C signal, at second input means 15 when the junction 67 is negative with respect to the junction 68, all diode devices 61, 62, 63 and 64 are reverse biased and there is essentially no current flow through resistances 71 and 72 and bias resistance 69. Under such conditions, the voltage of the A-C signal appearing at output means 16 is equal to the bias voltage applied to bias resistance 69.

When the voltage of the A-C signal applied to second input means 15 is smaller than that of the unidirectional voltage signal applied to first input means 14, the amplitude of the A-C output signal is equal to that of the A-C signal applied to second input means 15. For example, during the half cycle of the A-C signal at second input means 15 when junction 67 is positive with respect to junction 68, diode devices 62 and 63 are switched into conduction while diode devices 61 and 64 remain reverse biased. The current through bias resistance 69 is then equal to the voltage of the unidirectional signal at first input means 14 plus the output across transformer secondary winding 78 divided by the sum of resistances 69, 71 and 72. Thus, by making resistance 69 equal to the sum of resistances 71 and 72 (i.e. $R_{69}=R_{71}+R_{72}$) the voltage of the A-C signal appearing at output means 16 is essentially equal to the D-C input voltage plus one-half the voltage across transformer secondary winding 78.

During the half cycle of the A-C signal applied at second input means 15 when junction 67 is negative with respect to junction 68, diode devices 62 and 63 remain conductive and diode devices 61 and 64 are reverse biased so that an A-C output voltage appears at output means 16 which is equal to the voltage of the unidirectional signal at input means 14 minus one-half the output across transformer secondary winding 78. Thus, by selecting transformer 80 with a 1 to 2 step-up, the amplitude of the A-C signal at output means 16 will equal the lesser of the signals present at the first and second input means 14 and 15, respectively.

While only preferred features of the invention have been described in detail and shown by way of illustration, many changes and modifications will occur to those skilled in the art. It is, therefore, to be understood that the appended claims are intended to cover all such changes and modifications as fall within the true spirit and scope of the invention.

What I claim as new and desire to secure by Letters Patent of the United States is as follows:

1. A minimum quantity selector circuit arrangement for producing from a number of different unidirectional voltage signals a single alternating current output signal whose maximum value never exceeds a level determined by the magnitude of a preselected one of said signals, the combination comprising:
   (a) first electrical circuit means having an input and an output operative to eliminate all except the smallest magnitude of a plurality of unidirectional voltage signals at its input;
   (b) means applying all of said unidirectional voltage signals except said preselected signal to the input of said first circuit means to provide an output from said first circuit means corresponding to the applied signal having the smallest magnitude;
   (c) means for converting said preselected signal to an alternating current signal of a predetermined frequency and of an amplitude determined by the magnitude of the preselected signal;
   (d) a diode bridge circuit having first, second, third and fourth terminals;
   (e) means applying the output signal of said first electrical circuit means to the first terminal of said diode bridge circuit;
   (f) means applying the alternating current signal obtained from said preselected signal across the second and third terminals of said diode bridge circuit; and,
   (g) means for extracting at said fourth terminal of said diode bridge circuit an alternating current signal having an amplitude determined by the smaller magnitude signal applied to said diode bridge circuit.

2. The minimum quantity selector circuit arrangement of claim 1 wherein said means applying said alternating current signal obtained from said preselected unidirectional voltage signal across the second and third terminals of said diode bridge circuit is a transformer means having a step-up ratio of 1 to 2.

3. The minimum quantity selector circuit arrangement of claim 1 wherein said diode bridge circuit includes first, second, third and fourth diode devices and wherein said first terminal connects to the junction between the cathode and anode of said first and second diode devices, said second terminal connects to the junction between the anodes of said first and third diode devices, said third terminal connects to the junction between the cathodes of said second and fourth diode devices and said fourth terminal connects to the junction between the cathode and anode of said third and fourth diode devices.

4. A minimum quantity selector circuit arrangement for producing from a number of different magnitude unidirectional voltage signals a single alternating current output signal whose maximum value never exceeds a level determined by the magnitude of a preselected one of said signals, the combination comprising:
   (a) first electrical circuit means having an input and an output operative to eliminate all except the smallest magnitude of a plurality of unidirectional voltage signals at its input;
   (b) means applying all of said unidirectional voltage signals except said preselected signal to the input of said first electrical circuit means to provide for a unidirectional voltage output signal therefrom corresponding to the applied input signal having the smallest magnitude;
   (c) means for converting said preselected unidirectional voltage signal to an alternating current signal of a selected frequency and of an amplitude determined by the magnitude of said preselected unidirectional voltage signal;

(d) a controlled gate circuit means including:
  a diode bridge circuit having first, second, third and fourth diode devices arranged to provide a first junction between the cathode and anode of said first and second diode devices respectively, a second junction between the anodes of said first and third diode devices, a third junction between the cathodes of said second and fourth diode devices and a fourth junction between the cathode and anode of said third and fourth diode devices respectively;
  first input means associated with said first junction adapted to apply a first input signal to said diode bridge circuit;
  second input means associated with said second and third junctions adapted to apply a second input signal to said diode bridge circuit, said second input means including a 1 to 2 step-up transformer means having a primary winding and a secondary winding arranged to have one end thereof connected to said second junction through a first resistance and the other end thereof to said third junction through a second resistance of like value to the first resistance and output means including a third resistance connected from said fourth junction;

(e) means applying the unidirectional voltage output signal from said first electrical circuit means to the first input means of said controlled gate circuit means; and
(f) means applying the alternating current signal obtained from said preselected unidirectional voltage signal to said second input means so that an alternating current output signal is available at the output means of said controlled gate circuit means having an amplitude determined by the lesser of the amplitude of the signals applied to the first and second input means thereof.

References Cited
UNITED STATES PATENTS 2,689,336    9/1954    McMillan _____ 332—47 XR
3,031,142    4/1962    Cohen et al. ____ 307—321 XR DONALD D. FORRER, Primary Examiner
JOHN ZAZWORSKY, Assistant Examiner U.S. Cl. X.R.
307—257; 328—146; 332—47